(12) United States Patent
Chen et al.

(10) Patent No.: US 9,858,382 B2
(45) Date of Patent: Jan. 2, 2018

(54) COMPUTER PROGRAM PRODUCT FOR TIMING ANALYSIS OF INTEGRATED CIRCUIT

(71) Applicant: Realtek Semiconductor Corp., Hsinchu (TW)

(72) Inventors: Ying-Chieh Chen, Keelung (TW); Mei-Li Yu, Hsinchu (TW); Ting-Hsiung Wang, Kaohsiung (TW); Yu-Lan Lo, Hsinchu (TW); Shu-Yi Kao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 134 days.

(21) Appl. No.: 14/961,104

(22) Filed: Dec. 7, 2015

(65) Prior Publication Data

US 2016/0188782 A1    Jun. 30, 2016

(30) Foreign Application Priority Data

Dec. 26, 2014    (TW) .............................. 103145632 A

(51) Int. Cl.
*G06F 9/455*    (2006.01)
*G06F 17/50*   (2006.01)

(52) U.S. Cl.
CPC ...... *G06F 17/5081* (2013.01); *G06F 17/5031* (2013.01); *G06F 2217/84* (2013.01)

(58) Field of Classification Search
USPC ........................................................ 716/108
See application file for complete search history.

(56) References Cited

U.S. PATENT DOCUMENTS

2008/0216035 A1* 9/2008 Dirks .................. G06F 17/5031
                                                           716/113
2009/0228847 A1* 9/2009 Suaya ................. G06F 17/5036
                                                           716/136

* cited by examiner

*Primary Examiner* — Bryce Aisaka
(74) *Attorney, Agent, or Firm* — Birch, Stewart, Kolasch & Birch, LLP

(57) ABSTRACT

A computer program product stored in a non-transitory storage device of an integrated circuit (IC) timing analysis device includes: a netlist reading module for reading a netlist of an integrated circuit; a signal path analysis module for analyzing signal paths of a clock signal to generate a simplified netlist of the integrated circuit; a clock delay calculating module for calculating clock delays of the clock signal respectively corresponding to the signal paths.

6 Claims, 3 Drawing Sheets

COMPUTER PROGRAM PRODUCT FOR TIMING ANALYSIS OF INTEGRATED CIRCUIT

CROSS-REFERENCE TO RELATED APPLICATIONS

This application claims the benefit of priority to Patent Application No. 103145632, filed in Taiwan on Dec. 26, 2014; the entirety of which is incorporated herein by reference for all purposes.

BACKGROUND

The disclosure generally relates to a timing analysis approach of an integrated circuit and, more particularly, to a timing analysis approach capable of simplifying the analysis process while increasing the accuracy of the analysis.

Many semiconductor manufacturers or software developers create a standard cell library for widely-used circuit elements and provide characteristics for those standard cells. Accordingly, when adopting those standard cells, the circuit designer is enabled to accurately estimate the electrical characteristics of the circuit elements and the timings of the signals processed by the circuit elements, so that a desirable integrated circuit can thus be designed.

As is well known in related art, at least some circuit blocks in the analog circuit or mixed signal circuit are specially designed by the circuit designer rather than being realized with the standard cells. Therefore, when the circuit designer wants to analyze the signal timings of the analog circuit or mixed signal circuit, it is required to conduct simulation analysis for the entire circuit by inputting clock signals of different patterns into the circuit in order to figure out the killer pattern that affects the signal timings. However, the traditional timing analysis approaches are complicated and time-consuming. Furthermore, once the simulation is performed based on a pattern other than the correct killer pattern, it may be unable to locate some timing errors of the integrated circuit, thereby causing malfunction to the integrated circuit.

SUMMARY

An example embodiment of a computer program product is disclosed. The computer program product is stored in a non-transitory storage device of an IC timing analysis device. When the computer program product is executed by a control circuit of the IC timing analysis device, the computer program product enables the IC timing analysis device to analyze an integrated circuit having at least some non-standard cell elements. The computer program product comprises: a netlist reading module for reading a netlist of the integrated circuit, wherein the netlist comprises a beginning point and N terminal points of a clock signal of the integrated circuit and comprises N signal paths each exists between the beginning point and one of the N terminal points, and a transmission line or at least one circuit block exists between the beginning point and each of the N terminal points; a signal path analysis module for analyzing the N signal paths to generate a simplified netlist of the integrated circuit, wherein a first circuit block of the integrated circuit comprises an input terminal for receiving the clock signal and an output terminal for outputting the clock signal, if the input terminal and the output terminal are both coupled with a first signal path of the N signal paths, the signal path analysis module records the first circuit block in the simplified netlist for calculating a clock delay of the first signal path, and if the input terminal is coupled with the first signal path while the output terminal does not couple with the first signal path, the signal path analysis module records an impedance load in the simplified netlist to represent the first circuit block for calculating the clock delay of the first signal path; and a clock delay calculating module for calculating N clock delays of the clock signal respectively corresponding to the N signal paths.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
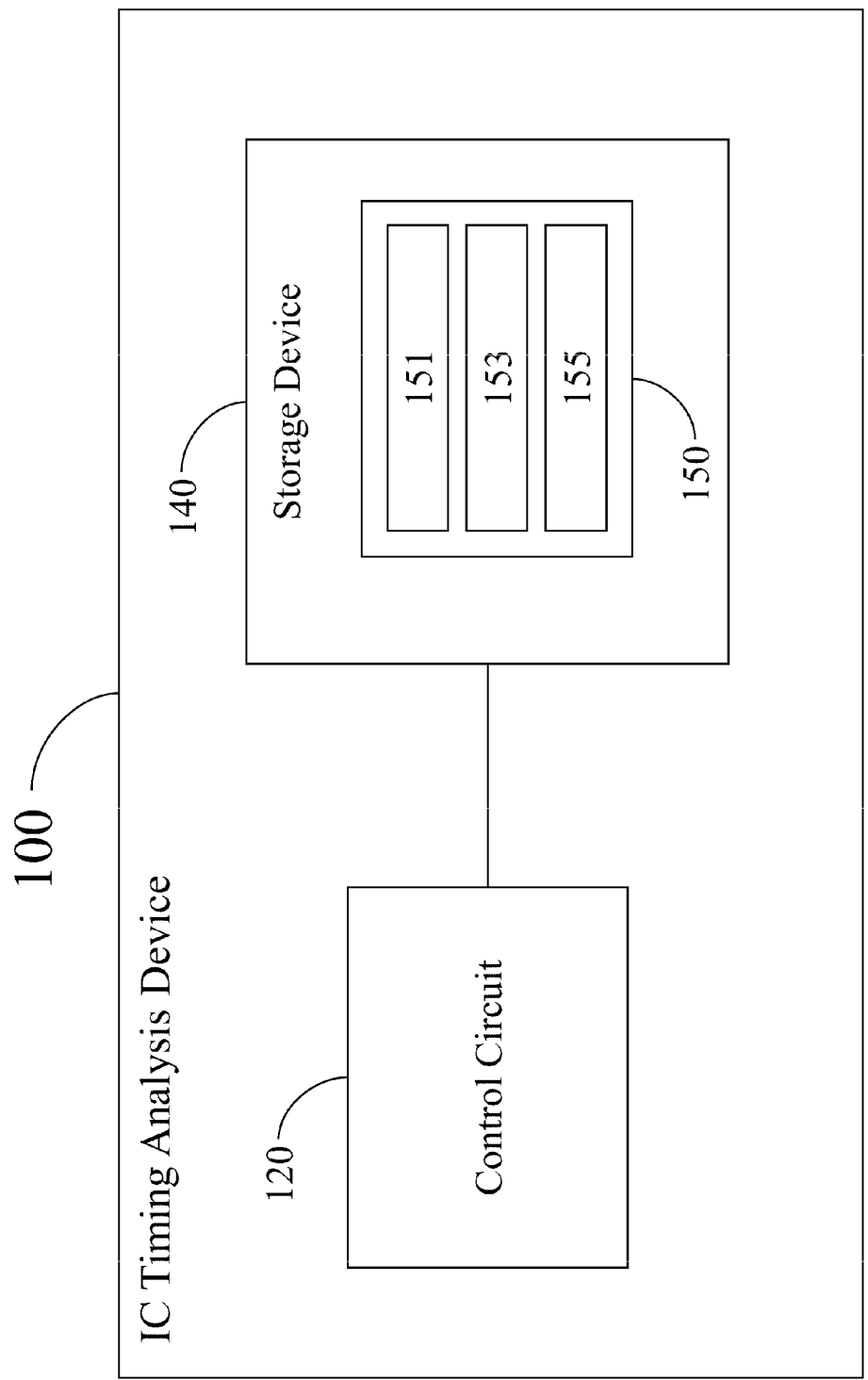
FIG. 1 shows a simplified functional block diagram of an IC timing analysis device according to one embodiment of the present disclosure.

FIG. 1 shows a simplified functional block diagram of an IC timing analysis device 100 according to one embodiment of the present disclosure. The IC timing analysis device 100 comprises a control circuit 120 and a storage device 140. The IC timing analysis device 100 may be realized with a computer or other appropriate computing apparatuses. The control circuit 120 may be realized with a CPU, a signal processor, or other customized circuits. The storage device 140 may be realized with a non-volatile storage device, such as a flash memory or a hard drive. For simplicity of illustration, other components in the IC timing analysis device 100, such as a random access memory and I/O circuits, and their connection relationship are not shown in FIG. 1.

In this embodiment, the control circuit 120 conducts a timing analysis for an integrated circuit (IC) to be developed by executing a computer program product 150 stored in the storage device 140. At least some circuit blocks of the IC to be developed are not realized with standard cells. That is, those circuit blocks are non-standard cell elements. For example, the IC to be developed may be an analog circuit or a mixed signal circuit.

The computer program product 150 comprises a netlist reading module 151, a signal path analysis module 153, and a clock delay calculating module 155. The netlist reading module 151 is designed for reading a netlist of the IC to be developed. The netlist is utilized for recording the real circuitry structure of the IC to be developed, so that the circuit designer can rely on the netlist to conduct circuitry analysis and simulation. The netlist may be stored in the storage device 140 or other storage devices. The signal path analysis module 153 is designed for analyzing the signal paths of the IC to be developed according to the netlist to generate a simplified netlist of the IC to be developed. The clock delay calculating module 155 is designed for calculating the clock delay or related parameters for each signal path based on the simplified netlist. For simplicity of illustration, other modules in the computer program product 150 are not sown in FIG. 1.

Figure 2:
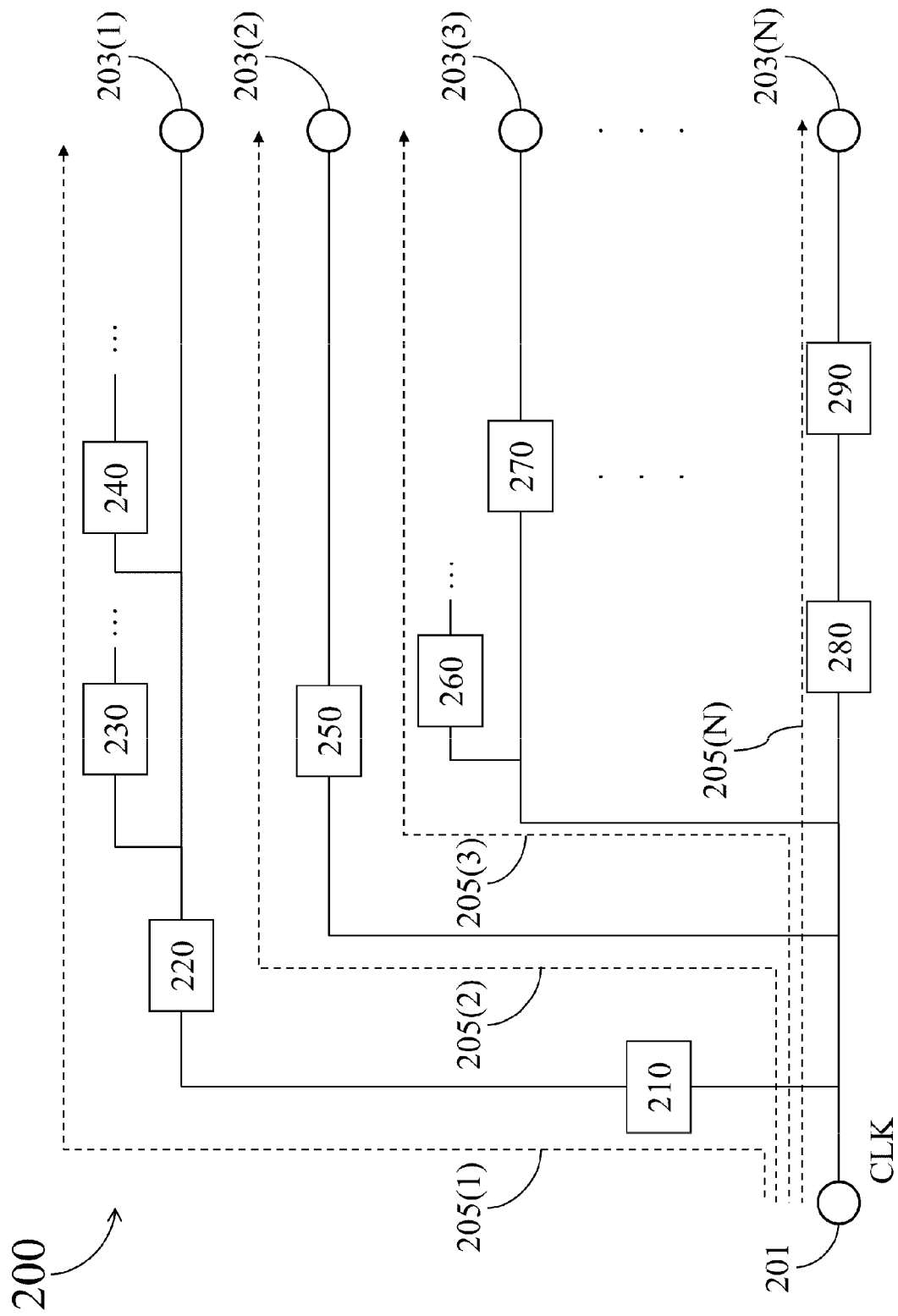
FIG. 2 shows a simplified functional block diagram of an IC according to one embodiment of the present disclosure.
Figure 3:
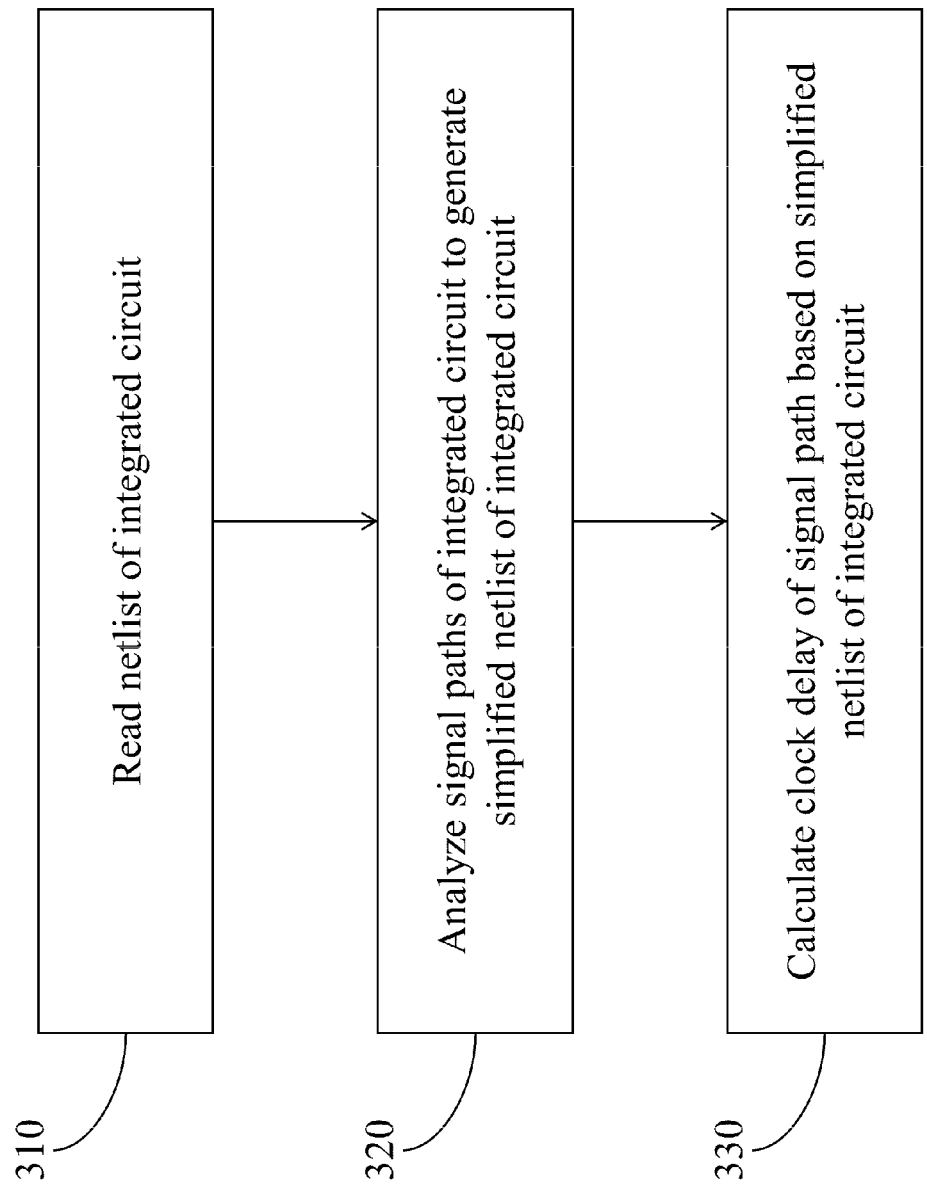
FIG. 3 shows a simplified flowchart of an IC timing analysis method according to one embodiment of the present disclosure.

FIG. 2 shows a simplified functional block diagram of an IC 200 according to one embodiment of the present disclosure. FIG. 3 shows a simplified flowchart of an IC timing analysis method according to one embodiment of the present disclosure. The IC timing analysis method of FIG. 3 will be further described in the following by reference to FIG. 1 and FIG. 2.

In the embodiment of FIG. 2, at least some circuit blocks in the IC 200 are not realized with standard cells. The IC 200 comprises a beginning point 201 and N terminal points 203(1), 203(2), 203(3), . . . , and 203(N) of a clock signal CLK, wherein N is a positive integer. The IC 200 comprises N signal paths 205(1), 205(2), 205(3), . . . , and 205(N), and each of the above signal path exists between the beginning point 201 and one of the terminal points 203(1)-203(N). In addition, one transmission line or at least one circuit block exists between the beginning point 201 and each of the terminal points 203(1)-203(N). For example, circuit blocks 210, 220, 230, and 240 exist between the beginning point 201 and the terminal point 203(1); a circuit block 250 exists between the beginning point 201 and the terminal point 203(2); circuit blocks 260 and 270 exist between the beginning point 201 and the terminal point 203(3); and circuit blocks 280 and 290 exist between the beginning point 201 and the terminal point 203(N).

In the embodiment of FIG. 2, only some circuit blocks are illustrated on the signal paths for simplicity of illustration. In other embodiments, one transmission line or one or more circuit blocks may exist on each signal path. Additionally, each circuit block may be coupled with one or more signal paths. Each circuit block may comprise one or more inverting circuits, buffer circuits (such as flip-flops, latch, or the like), multiplexing circuits, NAND circuits, NOR circuits, or other appropriate circuitry elements.

The IC timing analysis device 100 may utilize the control circuit 120 to execute the computer program product 150 in the storage device 140 to conduct timing analysis method of FIG. 3 for the IC 200 to acquire required timing information.

In the operation 310, the control circuit 120 executes the netlist reading module 151 of the computer program product 150 to read the netlist of the IC 200.

In the operation 320, the control circuit 120 executes the signal path analysis module 153 of the computer program product 150 to analyze the N signal paths of the IC 200 to generate a simplified netlist of the IC 200. The signal path analysis module 153 respectively analyzes the N signal paths of the IC 200. The signal path analysis module 153 analyzes each circuit block existing between the beginning point 201 and each terminal point to determine whether or not to record the circuit block in the simplified netlist of the IC 200. Suppose that a specific circuit block in the IC 200 comprises an input terminal for receiving the clock signal CLK and an output terminal for outputting the clock signal CLK. In one embodiment, for example, when the input terminal and the output terminal of the specific circuit block are both coupled with a first signal path, the signal path analysis module 153 records the specific circuit block in the simplified netlist of the IC 200, so that the clock delay of the first signal path can be calculated in view of the specific circuit block. In contrast, if the input terminal of the specific circuit block is coupled with the first signal path while the output terminal of the specific circuit block does not couple with the first signal path, the signal path analysis module 153 records an impedance load (such as a load having an appropriate capacitance or impedance) in the simplified netlist of the IC 200 to represent the specific circuit block, so that the clock delay of the first signal path can be calculated in view of the impedance load instead of the specific circuit block.

In the embodiment of FIG. 2, when the signal path analysis module 153 analyzes the circuit blocks 210, 220, 230, and 240 between the beginning point 201 and the terminal point 203(1), since the input and output terminals of the circuit blocks 210 and 220 are both coupled with the signal path 205(1), the signal path analysis module 153 records the circuit blocks 210 and 220 in the simplified netlist of the IC 200, so that the clock delay of the signal path 205(1) can be calculated in view of the circuit blocks 210 and 220. In comparison, the input terminals of the circuit blocks 230 and 240 are coupled with the signal path 205(1), but the output terminals of the circuit blocks 230 and 240 are not coupled with the signal path 205(1). Hence, the signal path analysis module 153 records two impedance loads in the simplified netlist of the IC 200 to respectively represent the circuit blocks 230 and 240, so that the clock delay of the signal path 205(1) can be calculated in view of the two impedance loads instead of the circuit blocks 230 and 240.

According to analogous analysis principle, the signal path analysis module 153 records the circuit block 250 in the simplified netlist of the IC 200, so that the clock delay of the signal path 205(2) can be calculated in view of the circuit block 250. The signal path analysis module 153 records the circuit block 270 in the simplified netlist of the IC 200 and records an impedance load in the simplified netlist of the IC 200 to represent the circuit block 260, so that the clock delay of the signal path 205(3) can be calculated in view of the circuit block 270 and the impedance load. The signal path analysis module 153 records the circuit blocks 280 and 290 in the simplified netlist of the IC 200, so that the clock delay of the signal path 205(3) can be calculated in view of the circuit blocks 280 and 290.

In the operation 330, the control circuit 120 executes the clock delay calculating module 155 of the computer program product 150 to calculate N clock delays of the clock signal CLK with respect to the N signal paths 205(1), 205(2), 205(3), . . . , and 205(N) through circuitry simulation based on the simplified netlist of the IC 200 generated in the operation 320.

In the previous embodiment, each of the circuit blocks (such as the circuit blocks 210, 220, 250, 270, 280, and 290) recorded in the simplified netlist of the IC 200 by the signal path analysis module 153 may further comprise other control terminals. Appropriate signal values should be applied to the control terminals, so that the circuit block can output the clock signal CLK (or the inverted signal of the clock signal CLK) at its output terminal according to the clock signal CLK at its input terminal. In one embodiment, for example, the circuit block 210 is a NAND circuit. In the simplified netlist of the IC 200, one of the input terminals of the NAND circuit is utilized for receiving the clock signal CLK, and the signal path analysis module 153 applies a signal value represent 1 to another input terminal (hereinafter, referred to as the control terminal) of the NAND circuit. Accordingly, the circuit block 210 outputs an inverted signal of the clock signal CLK at its output terminal.

In addition, the signal path analysis module 153 may analyze the N signal paths of the IC 200 from different abstract level perspective. For example, the signal path analysis module 153 may conduct the analysis from the logical function level of the circuit blocks while apply appropriate signal values to the control terminals of the circuit blocks in the simplified netlist of the IC 200, so that the circuit block can output the clock signal CLK (or the inverted signal of the clock signal CLK) at its output terminal according to the clock signal CLK at its input terminal In another embodiment, the signal path analysis module 153 may conduct the analysis from the transistor level. In the simplified netlist of the IC 200, except for the input terminal of the circuit block (such as the gate terminal in the case of FET or the base terminal in the case of BJT) which is utilized for receiving the clock signal CLK, the signal path analysis module 153 may apply appropriate signal values to the control terminals of other transistors, such as apply a signal value representing 1 to the gate terminal of a PMOS transistor while apply a signal value representing 0 to the gate terminal of a NMOS transistor, so that the circuit block can output the clock signal CLK (or the inverted signal of the clock signal CLK) at its output terminal according to the clock signal CLK at its input terminal In addition, the signal path analysis module 153 may record whether the clock signal outputted at the output terminal of the circuit block in the simplified netlist of the IC 200 is inverted with respect to the clock signal received at the input terminal of the circuit block, so that the clock delay calculating module 155 can correctly calculate the clock delay of each signal path according to the rising edge or the falling edge of the clock signal at the terminal point of each signal path.

In the previous embodiment, when the signal path analysis module 153 records impedance loads in the simplified netlist of the IC 200 to respectively represent the circuit blocks 230, 240, and 260, the signal path analysis module 153 may respectively assign appropriate impedance values for those impedance loads. In another embodiment, the signal path analysis module 153 may respectively couple one or more conductive terminals of the circuit block to one or more predetermined voltage levels, so that the circuit block becomes an impedance load in the simplified netlist of the IC 200. For example, in one embodiment where the circuit block 230 comprises multiple cascaded CMOSs, the signal path analysis module 153 may couple the source terminals and the drain terminals of the CMOSs with a same predetermined voltage level in the simplified netlist of the IC 200, so that the CMOSs become a CMOS capacitor. In another embodiment where the circuit block 240 comprises multiple cascaded CMOSs, the signal path analysis module 153 may merely record a very first CMOS coupled with the signal path in the simplified netlist of the IC 200 while couple the source terminal and the drain terminal of the first CMOS with a same predetermined voltage level, so that the CMOSs become a CMOS capacitor. This approach further simplifies the circuit blocks on the signal path, and only causes tiny influence to the accuracy of the timing analysis.

In the previous embodiments, the clock delay calculating module 155 may be configured to further calculate other parameter according to the clock delays of the signal paths. For example, the clock delay calculating module 155 may calculate a clock skew of the IC 200 by subtracting a minimum value of the N clock delays of the N signal paths in the simplified netlist of the IC 200 from a maximum value of the N clock delays in the simplified netlist of the IC 200.

It can be appreciated from the foregoing descriptions, the disclosed embodiments analyze whether or not to replace the circuit blocks of the integrated circuit with impedance loads in the simplified netlist. This approach not only reduces the complexity of timing analysis, but also reduces the adverse influence to the analysis accuracy.

In addition, the disclosed embodiments automatically simplifies the signal paths of various types of analog circuit or mixed signal circuits, and thus the required time for timing analysis can be effectively reduced while maintains the accuracy of the timing analysis.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A computer program product for analyzing the timing of an integrated circuit, the computer program product comprising:

a netlist reading module for reading a netlist of the integrated circuit, wherein the integrated circuit is an analog circuit or a mixed signal circuit, a first circuit block of the integrated circuit comprises an input terminal for receiving the clock signal and an output terminal for outputting the clock signal, the netlist comprises a beginning point and N terminal points of a clock signal of the integrated circuit and comprises N signal paths each exists between the beginning point and one of the N terminal points, and one transmission line or at least one circuit block exists between the beginning point and each of the N terminal points;

a signal path analysis module for simplifying the netlist of the integrated circuit to generate a simplified netlist of the integrated circuit by recording an impedance load in the simplified netlist to represent the first circuit block if the input terminal is coupled with a first signal path of the N signal paths while the output terminal does not couple with the first signal path; and a clock delay calculating module for calculating N clock delays of the clock signal respectively corresponding to the N signal paths based on the simplified netlist to reduce required time for timing analysis, wherein the clock delay calculating module calculates a clock delay of the first signal path in the simplified netlist in view of the impedance load instead of the first circuit block.

2. The computer program product of claim 1, wherein when the input terminal and the output terminal of the first circuit block are both coupled with the first signal path, the signal path analysis module configures one or more control terminals of the first circuit block, so that the first circuit block outputs the clock signal or an inverted signal of the clock signal at the output terminal according to the clock signal received at the input terminal.

3. The computer program product of claim 1, wherein when the input terminal of the first circuit block is coupled with the first signal path while the output terminal does not couple with the first signal path, the signal path analysis module respectively couple one or more conductive terminals of the first circuit block to one or more predetermined voltage levels, so that the first circuit block becomes the impedance load in the simplified netlist.

4. The computer program product of claim 3, wherein the signal path analysis module only records a very first CMOS coupled with the input terminal of the first circuit block in the simplified netlist, and couples both a source terminal and a drain terminal of the CMOS with a first predetermined voltage level.

5. The computer program product of claim 1, wherein when the input terminal and the output terminal of the first circuit block are both coupled with the first signal path, the signal path analysis module records whether the clock signal outputted at the output terminal of the first circuit block is inverted with respect to the clock signal received at the input terminal of the first circuit block, so that the clock delay of the first signal path can be calculated accordingly.

6. The computer program product of claim 1, wherein the clock delay calculating module calculates a clock skew of the integrated circuit by subtracting a minimum value of the N clock delays of the N signal paths from a maximum value of the N clock delays.

* * * * *